(12) United States Patent
Fargas et al.

(10) Patent No.: US 8,599,005 B2
(45) Date of Patent: Dec. 3, 2013

(54) METHOD FOR DETERMINING THE DRIVING LIMITS OF A VEHICLE

(75) Inventors: Thierry Fargas, Nice (FR); Dominique Clarac, Nice (FR)

(73) Assignee: NODBOX, Sophia Antipolis (FR)

( * ) Notice: Subject to any disclaimer, the term of this patent is extended or adjusted under 35 U.S.C. 154(b) by 625 days.

(21) Appl. No.: 12/306,442

(22) PCT Filed: Jun. 20, 2007

(86) PCT No.: PCT/EP2007/056155
§ 371 (c)(1),
(2), (4) Date: Dec. 23, 2008

(87) PCT Pub. No.: WO2007/147855
PCT Pub. Date: Dec. 27, 2007

(65) Prior Publication Data
US 2009/0201140 A1    Aug. 13, 2009

(30) Foreign Application Priority Data

Jun. 23, 2006 (FR) ..................... 06 05654

(51) Int. Cl.
*B60Q 1/00* (2006.01)
(52) U.S. Cl.
USPC ........ 340/441; 340/425.5; 340/440; 340/438; 340/903; 340/905; 340/929; 340/936; 340/995.21; 180/179; 180/197; 180/282; 701/1; 701/38; 701/93; 701/301
(58) Field of Classification Search
USPC ............... 340/441, 438, 425.5, 440; 180/282, 180/179, 197; 701/38, 1, 93, 301
See application file for complete search history.

(56) References Cited

U.S. PATENT DOCUMENTS

| | | | |
|---|---|---|---|
| 5,742,240 A * | 4/1998 | Asanuma et al. | 340/995.21 |
| 6,516,273 B1 * | 2/2003 | Pierowicz et al. | 701/301 |
| 6,526,352 B1 * | 2/2003 | Breed et al. | 701/470 |
| 6,853,889 B2 * | 2/2005 | Cole | 701/19 |
| 6,856,868 B1 * | 2/2005 | Le et al. | 701/38 |
| 7,184,873 B1 * | 2/2007 | Idsinga et al. | 701/93 |
| 7,480,562 B2 * | 1/2009 | Kustosch | 701/93 |
| 2002/0198632 A1 * | 12/2002 | Breed et al. | 701/1 |
| 2006/0208169 A1 * | 9/2006 | Breed et al. | 250/221 |
| 2006/0253747 A1 * | 11/2006 | Gillies et al. | 714/712 |

FOREIGN PATENT DOCUMENTS

| | | |
|---|---|---|
| DE | 102 58 167 | 7/2003 |
| DE | 10258167 A1 * | 7/2003 |
| JP | 5054299 A | 3/1993 |
| JP | 6080046 A | 3/1994 |
| JP | 2000127803 A | 5/2000 |

OTHER PUBLICATIONS

International Search Report dated Nov. 6, 2007, from corresponding PCT application.

* cited by examiner

*Primary Examiner* — George Bugg
*Assistant Examiner* — Paul Obiniyi
(74) *Attorney, Agent, or Firm* — Young & Thompson

(57) ABSTRACT

A method for making it possible to set the link between all the types of vehicles and roads with the rolling limits on the roadway is described. This setting can be established from the existing road data bases and from the characteristics of the known vehicles. This method is capable of determining the vehicle rolling limits. A device which can be fitted on any vehicle and capable of implementing the method according to the invention is also disclosed.

22 Claims, 8 Drawing Sheets

METHOD FOR DETERMINING THE DRIVING LIMITS OF A VEHICLE

The present invention relates to a method as well as a device for determining the rolling limits of a vehicle moving on the traffic lane of a roadway.

This method makes it possible to set the connection between any type of vehicles and roads with the rolling limits on said road. This setting can be performed from the existing road databases and from the characteristics of the known vehicles. The invention also makes it possible to create a multi-variable sequenced index providing the follow-up of the path of a vehicle in a relative way and improving the positioning of said vehicle.

The invention also concerns a device which can be mounted on any vehicle and can be coupled to any existing navigation system, the device producing security and positioning indicators in real time. In addition, this device can be used by road managers with a view to improving the prevention and protection means.

At present, there is no system capable of indicating the rolling limits of the road portion ahead. In addition, most of the driving vehicles have no assistance of the ESP type (for Electronic Stability Program).

The systems monitoring the vehicle behaviour are not capable of foreseeing the permanent dangers located just ahead of the road.

Some sophisticated vehicles are equipped with a set of sensors positioned on the steering wheel, the steering system, the brakes, the shock absorbers, the slide-slipping of the wheels, or the differential are capable of giving information relating to the limits of the dynamic behaviour of the vehicle. Such information are then transmitted to the single chamber master cylinder and the assist devices of the ABS (Anti-Blocking System) and ESP types. Such systems are servo-controlled by the information from the sensors, which ensures only a reactive type of assistance.

Whatever the sophistication of such systems, they are blind and are incapable of anticipating a bend or of locating the vehicle with respect to the reality of the road. Under certain conditions, for example an emergency braking on a mountain road, due to a misjudgement of the road, or under extreme conditions like black ice, they may be counter productive.

In addition, road map systems are known, which are used by road managers or aboard navigation systems. These systems never mention the rolling limits on each portion of the road for such or such vehicle family. They are not accurate enough to be used as references for the driving assistance system. Then measurement discrepancies which could reach one hundred meters have been noted.

Navigation systems using a GPS (Global Positioning System) are also known for giving a reference to the vehicle travels. Because of their design, such positioning systems whether they are of the GPS or Galiléo type, meet a physical limit which makes their accuracy non-constant and non-absolute. The navigation systems use methods currently called MAP MATCHING, based on the utilisation of gyroscopes, accelerometers, which make it possible to balance the map mistakes and inaccuracies of the GPS systems for the navigation. However, the navigation MAP MATCHING is not capable of managing the path of a vehicle even in a relative way.

A device is known from document EP-A1-0763712 which tries to improve the accuracy of the navigation systems. This device is based on cinematic type information only and is not able to determine the rolling limit values.

A reference system is also known from document EP-A1-0561170 for comparing the current information and improving the positioning with respect to a railway. This technique is connected to railways and can hardly be applied to driving on roads.

Document U.S. Pat. No. 6,098,007 provides the control of the dynamic acceleration of the vehicle without any anticipation and without taking into account the path of the vehicle in the control parameters.

Thus, a need exists for providing an improved device and a method making a correlation between the parameters of traffic lanes and vehicles, and the rolling limit values so as to be able to determine, advantageously for any type of vehicle and road, relations which can be used more particularly for a driving assistance or an improved design, protection and prevention on roads.

According to the prior art, in the case of the ESP or ABS type systems, a constant prejudice exists which consists in thinking that the driving assistance must be substantially operated in a reactive way, i.e. after the real time measurement by a plurality of onboard sensors. The invention overcomes this prejudice and recommends a system which can associate the measures in real time of course but which can also provide an anticipation of vehicle behaviour more particularly while taking into account the path of said vehicle and all the parameters related to the traffic lane, among which the three dimensional geometry thereof, as well as the characteristics thereof such as the road, covering type or the quantity of water on the surface.

Following to an application, the present invention is intended for collecting information on the geometry of roads and of the aboard utilisation of information.

Other aims and advantages will appear while reading the detailed following description, the aim of which is not aiming at limiting the invention.

It should be previously reminded that the present invention relates to a method for determining the rolling limits of a vehicle moving on the traffic lane of the roadway, characterised by the fact that it includes the steps consisting in:
  obtaining geometric data defining the traffic lane,
  obtaining data characterising the traffic lane,
  obtaining data defining the vehicle path,
  obtaining data characterising the vehicle,
  determining rolling limits values of the vehicle in real time by calculation means.

According to preferred but non-limitative embodiments, this method is such that:
  the rolling limits are selected among the rollover speed, the rollover acceleration, the slide-slip speed and the slide-slip acceleration,
  the determination of the rolling limit values is performed using a neural network,
  it includes a prior step of the neural network learning from the acquisition of: —data characterising families representing the vehicles, —geometric data and characterising data of a sample representing traffic lanes,
  the learning by the neural network includes: —a step of setting between vehicle characterising data, geometric and characterising simplified data of the traffic lane and the rolling limits; —a step of setting between the vehicle characterising data, the data on the permissible path of the vehicle with respect to the traffic lane and the rolling limits; —a step of setting between data characterising the vehicle, data characterising the vehicle in motion i.e.: the speed of the centre of gravity with respect to X and Y, rate of yaw, the acceleration of the centre of gravity with respect to X and Y, the drift angle, the steering of the wheel, the speed of the steering wheel and the rolling limits, particular points are defined on the traffic lane and the positions thereof are defined, the complex relations between all the variables characterising the traffic lane, the permissible dynamic paths and the particular points are defined, the motion of the vehicle is measured, the existence of particular points is deduced, and the relative path of said vehicle is determined, the measured data are compared to the position of particular points upon the passage of the vehicle in front of said particular points so as to increase the accuracy of the vehicle location, the particular points are defined by curvature, angle or altitude changes criteria which are remarkable, geometric data defining the traffic lane, data characterising the traffic lane, data defining the vehicle path, data characterising the vehicle and the variables of the rolling limits are obtained by—simulation, —or real measures, —or the vehicle manufacturer, —or an independent organisation communication qualification values, —or by the transmission of information delivered by map data suppliers, —or through the processing of video images or satellite pictures in real time or delayed time, the limit rolling values are compared with the instantaneous values of the rolling of the vehicle;

a warning is generated for the driver when an instantaneous value is greater than the corresponding limit value;

at least one indicator accessible to the vehicle driver is generated, in order to inform him or her, of the danger in the path, or an improved position, or the existence of a relief or a slope;

at least one indicator of incidence on the safety of the instantaneous speed of the vehicle at the given spot and downstream of the traffic lane is generated in real time to the driver relative to at least one following parameter: rolling limit, the path thereof, the regulatory speed, data characterising the traffic lane, and the weather conditions.

the data characterising a sample representing the traffic lane include at least one of the following criteria:

an adherence parameter;

data indicating danger;

data indicating the obligation of a slow velocity passage.

the rolling limits include at least one of the following limits:

braking limit, acceleration limit, travelling limit;

instruction on the opposite lane, ram off roadway accident, frontal collision with a vehicle, rear collision with a vehicle, collision with an engineering structure, collision with an obstacle on the road, collision with pedestrians;

global adherence, rolling characteristic of the road relative to onboard equipment, characteristics of the road with respect to the passengers' comfort, characteristics of the road with regards to the driver's fatigue;

defects and failures: driving, driver, vehicle and equipment of the vehicle, selection of the adjustment modes, variables to be corrected;

the rolling limits include the traffic limits selected among: a slow down of the traffic, driving up a traffic line, a traffic flow.

learning by the neural network includes:

a step of setting between geometric data, map data, crossing roads, types of vehicles driving on these roads, signalling, variable signs, alternate street lights, the number of types of vehicles driving on these roads, the speed of the types of vehicles driving on these roads, simultaneous weather conditions, simultaneous ephemerides, simultaneous events on and off the road, simultaneous accidentology, and the rolling limits.

The invention also relates to a device capable of implementing the method.

According to advantageous but non-limitative alternative solutions, the device is such that it includes a neural network for determining the rolling limit values, and it includes a circuit of the in situ programmable gate network for a strongly parallel processing of data.

The appended drawings are given as examples and do not aim at limiting the invention. They only represent an embodiment of the invention and make it possible to understand it easily.

DSP: (digital signal processing), signal data calculation
LUT: (look-up table), table giving access to a memory space
ROM: (read only memory), a memory which is accessible for reading only,
RAM: (random access memory)
SUM: sum
FF1: Flip Flop 1
Shape: is the shape of activation functions For each neuron, the synaptic coefficients are stored in the ROM of the LUT, the addition and multiplication functions are performed by a DSP, the bias is considered as a multiplying coefficient C, the activation function is stored in a ROM.

Figure 9:
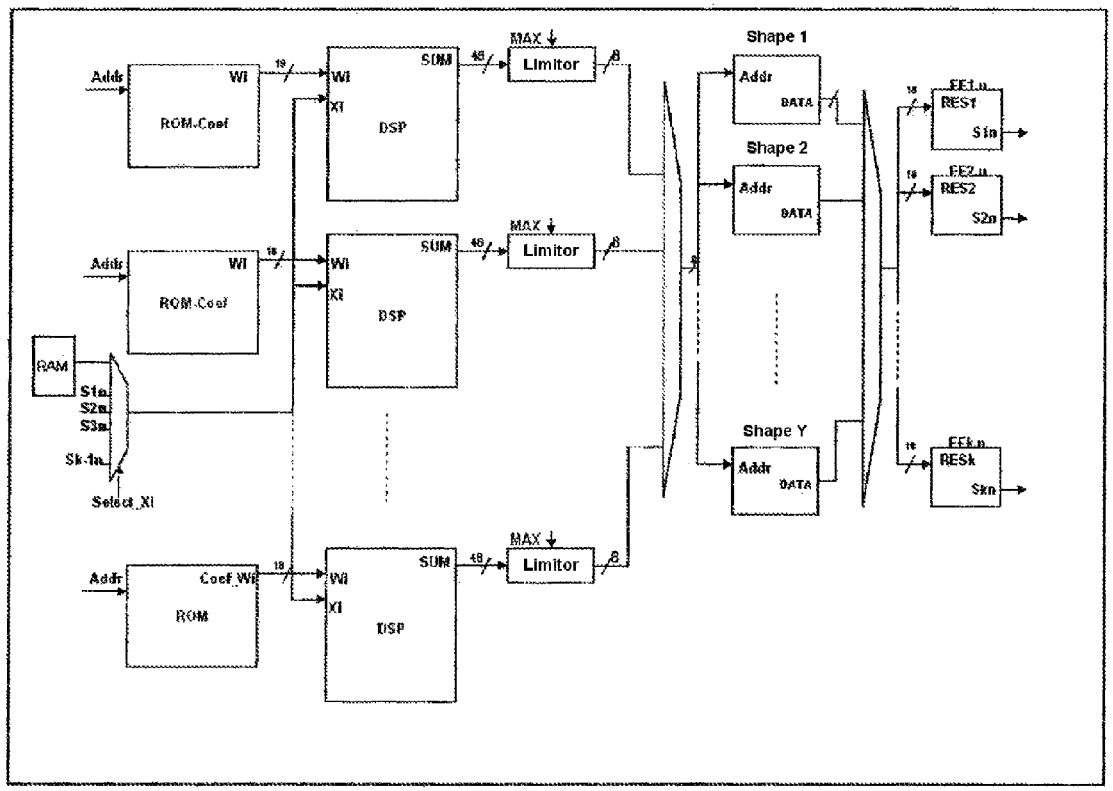

FIG. 9 is a technical diagram for the portage of a network of nodes retrieving indications in an FGPA.

DSPs are dedicated to a neuron number in each layer, for example DSP 1 is dedicated to all first neurons in all the layers. The controller drives this allocation, the synaptic coefficients belonging to each neuron of each layer are stored in the ROMs of the LUTs and are addressed to each neuron as a function of the controller's instructions. The DSP will multiply each coefficient by the corresponding input variable $X_i$ addressed by the controller.

Each output of each neuron in each layer $S1n$, $S2n$, $Skn$ may become an input of the following layer, this reallocation being also driven by the controller.

In this figure, the abbreviations are as follows:
$W_i$: synaptic coefficient
$X_i$: numeric value of the variable A first step of the invention consists in setting (setting 1) the existing cause to effect in relation between the characteristics of the measured vehicles and the characteristics of the road used with the obtained rolling limits.

Figure 1:
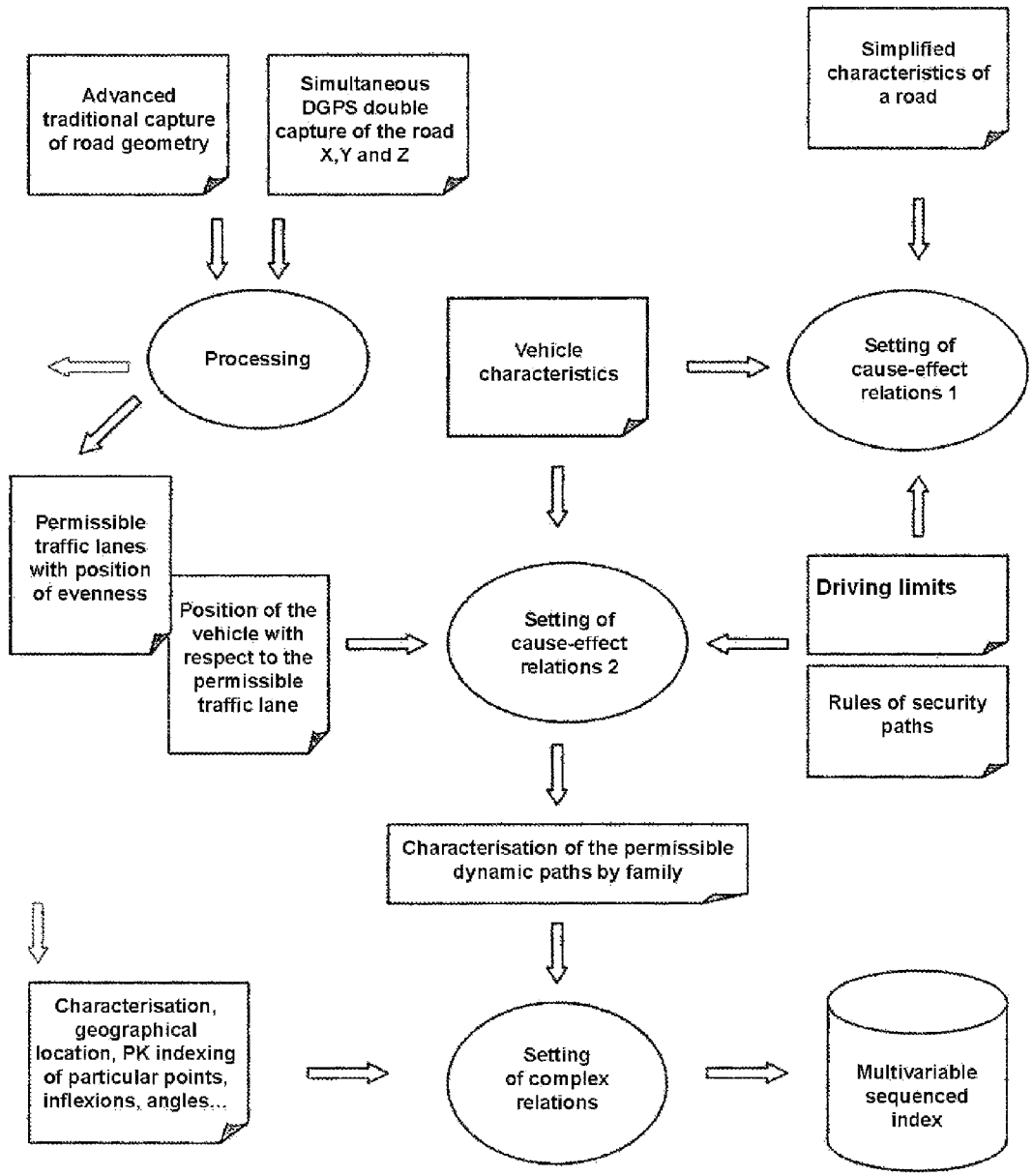
FIG. 1 is a synthetic representation of the steps of the methods for setting the cause-effect relations and the setting of complex relations within the scope of the invention.
Figure 2:
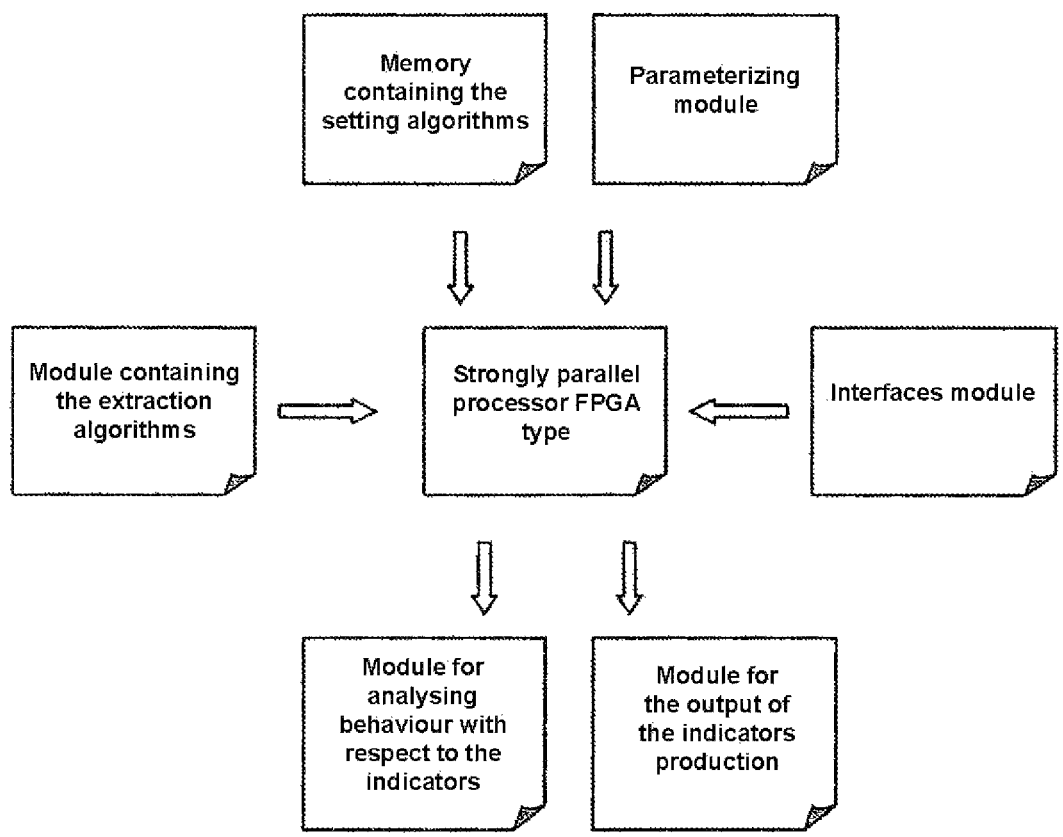
FIG. 2 is an example of a member constituting an on board device for implementing the invention.
Figure 3:
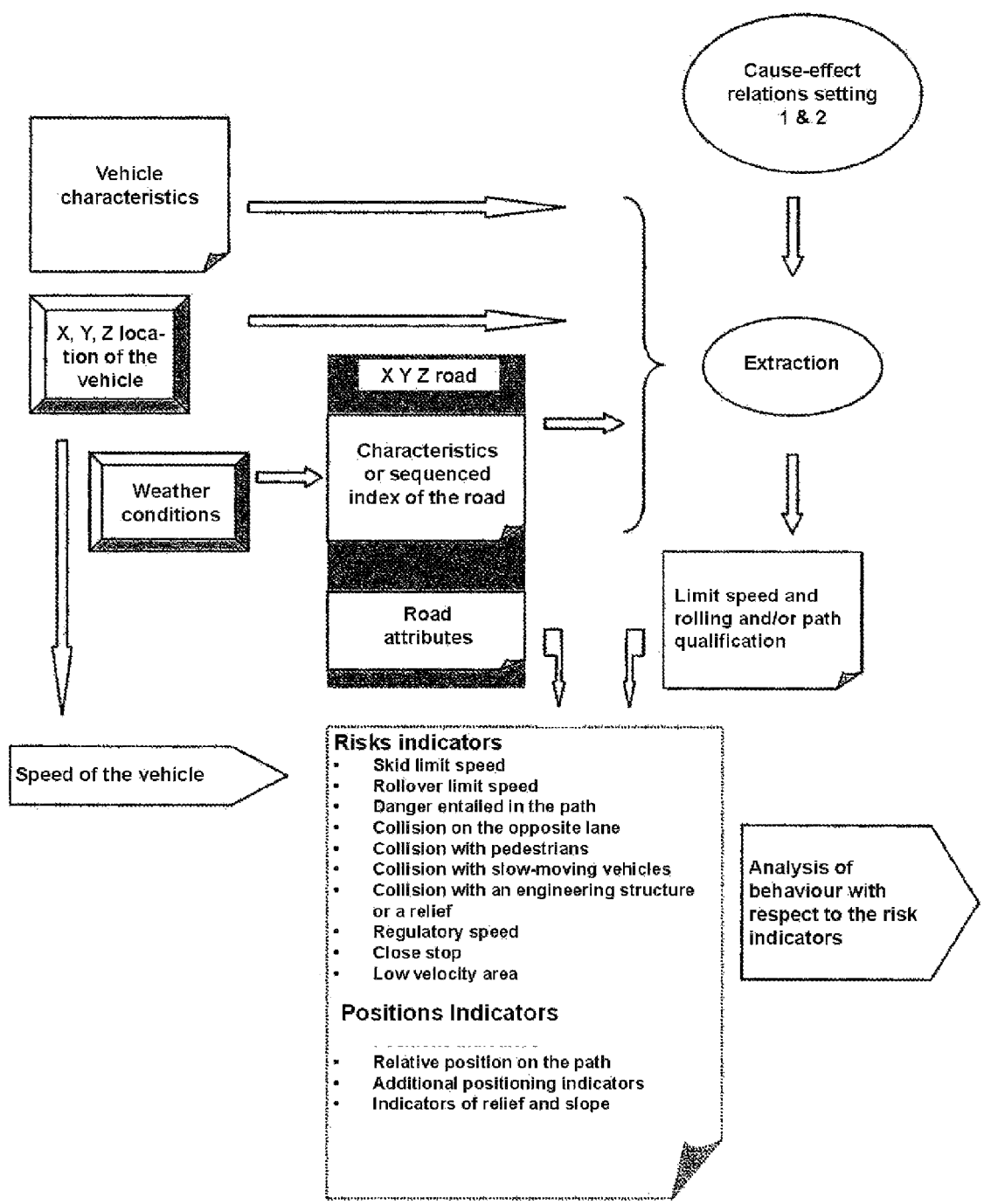
FIG. 3 is a diagram showing a step of retrieval of indicators.
Figure 4:
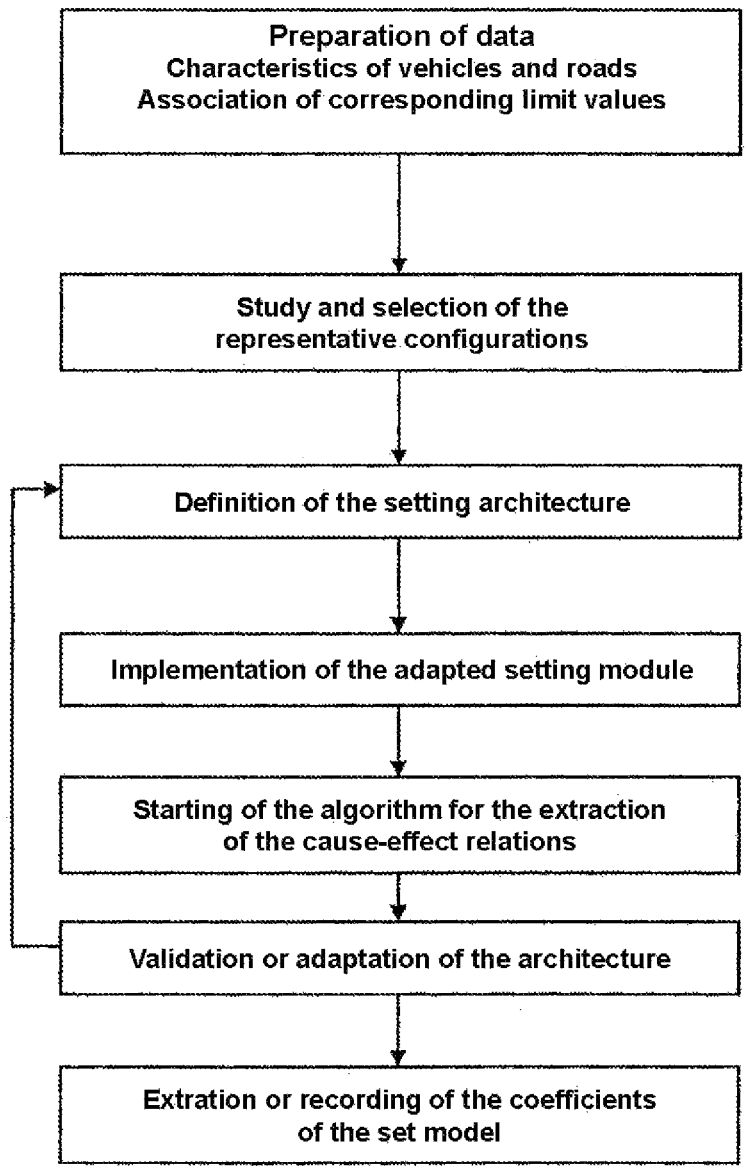
FIG. 4 is a block diagram showing the steps of a first setting.

While referring to FIG. 4, the setting is performed by vehicle family and increasingly, if so desired, the settings are merged so as to obtain only one setting.

Certain settings may be merged like for example the VLs (light duty vehicles) on the one hand, heavy goods vehicles on the other hand and then semi-trailer goods vehicles.

At the beginning, it is possible to redesign the architecture but once it has been validated for an assembly of close families, the architecture is stable.

The setting can be refined when and as the new road data are produced or when and as vehicles are characterised with finer variables.

Setting 1 does not distinguish the path of the vehicle and it is considered that the road and the path are identical.

Therefore, it will not be possible to give information relating to the path.

Each vehicle is taken into account as regards the own characteristics thereof, which are compared to those of the family to which it belongs; the conditions of the vehicle and the load of the vehicle are characterised according to the variables which makes it possible to draw a comparison between the vehicles. The road is also characterised according to a set of variables. The above-mentioned characteristics make it possible to efficiently characterise different vehicles, said variables may be used to specify differences. In a similar way, finer characteristics may be used for characterising a road.

Characteristics of the Vehicle
Classification into Families
  wheel drive types: front, rear, four-wheel drive
  Weight/Power output
  Dimensions
  Mass
  Wheel base
  Others
Condition of the Vehicle
  Tyre condition
  Shock absorbers condition
  Steering system direction
  Tyre inflation pressure
  Brake dissymmetry
  Adjustments of front and rear tows
  Others
Load of the Vehicle
  Measured load
  Characteristics of the Road
  Road: dry, wet, black ice
  Coating type: Class, age, altitude, exposure
  Coating wear rate
  Evenness
  Bend
  Slope
  Super elevation
  Others There are an infinity of combinations of vehicle, road, utilisation conditions, characteristics. It is impossible to give an exhaustive definition of these combinations. The invention makes it possible to determine at moment 1 or to foresee downstream at moment 1+n, the rolling limit values corresponding to a combination and even though the combination is not the subject of a qualification of cause-effect relationship.

The second step consists in extrapolating the cause-effect results obtained for a few vehicles and for a sample of roads, to any type of vehicle and any type of road. To be strict, the extrapolation must be performed by family or by assemblies of close families. For example, it is not possible to extrapolate the limits of the passage of a motor cycle from cause-effect relations determined for trucks.

The method for setting cause-effect relations and the extrapolation can be performed for example by a neural network technique.

Firstly, the invention is a method making it possible to determine, in real-time, the rolling limits of a vehicle at the location thereof and to inform it of the rolling limits downstream of this position.

The rolling limits can be superimposed to the constraints originating in the road attributes.

The invention is also a device providing in real-time indicators as a function of the entries available in the vehicle:
  Skid limit speed
  Rollover limit speed
  Collision on the opposite lane
  Collision with pedestrians
  Collision with slow-moving vehicles
  Collision with an engineering structure or a relief
  Regulatory speed
  Close stop
  Low velocity area The rolling limit speed (skid or rollover) shows the key parameter synthesizing numerous dynamic values; the reduction in this limit speed indicates either that the conditions, the geometry or the characteristics of the road are degraded or that the driver's action will lead to a path reducing the limit speed.

At a constant speed, for identical characteristics of the vehicle and the road, any change in the path results in a change in the rolling limits.

Under the normal operating conditions, the incidence of the path difference is low; under extreme conditions of excessive speed, degraded conditions, the incidence of the change in the path may be of major importance. In addition, in the case where a driver, accidentally or intentionally, does not comply with the road regulations and when he trespasses the opposite lane by choosing to follow the inside of the lane, as in a competition, the real instantaneous limit speed is increased and is no longer a security indicator.

The invention associates to the rolling limits an analysis of the path in order to complete a notion of speed with the notion of position on the road.

The invention is innovative due to a DGPS (differential GPS) technique of the simultaneous double capture of the points X, Y and Z corresponding to the ends of the width of the lane. This technique delimits the measure of the lane and gives a horizontal reference. This innovative technique of capture is executed simultaneously with and superimposed to the captures of information executed by the commercially available metrology vehicles which carry out examinations and then determine the evenness of the road. Among other things, the evenness shows the sinkings in the lane on the wheels path.

The double DGPS capture is carried out with a slight delay for each side of the road, and the obtained values are completed, during the processing by calculations, with information from gyroscopes, accelerometers, capture vehicle motions compensators.

The invention makes it possible to determine an authorized traffic lane by processing variables including variables such as the evenness. This processing makes it possible to characterize, to geographically locate and to use as reference geometric points, institutions, particular points such as the curvature of bends, angles . . . .

The method also makes it possible to set (setting 2) the cause-effect relations between the position of the vehicle relative to the traffic lane plus the characteristics of the vehicle and the rolling limits. The setting is established from a certain number of roads representing a variety of geometries and some vehicles the characteristics of which are known, and it is subsequently extrapolated to any type of road and to any type of vehicle.

The setting limited by rules of security paths makes it possible to characterize the permissible dynamic paths.

Figure 5:
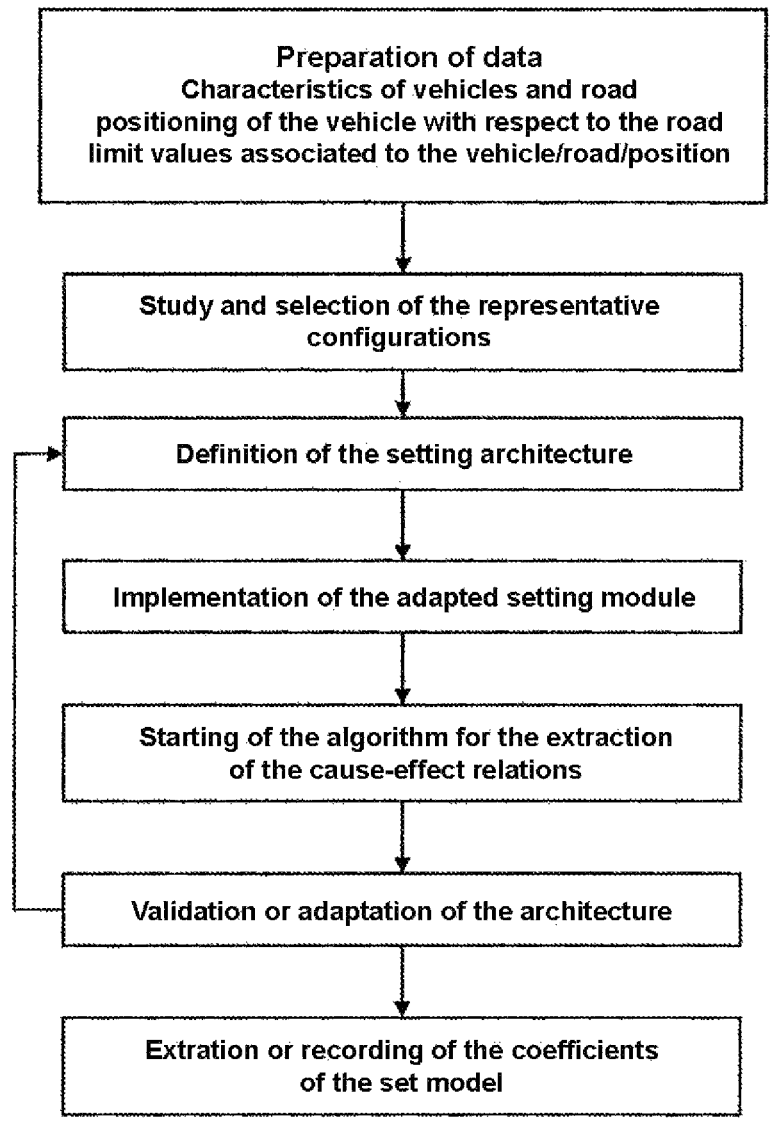
FIG. 5 is a block diagram showing the steps of a second setting.
Figure 6:
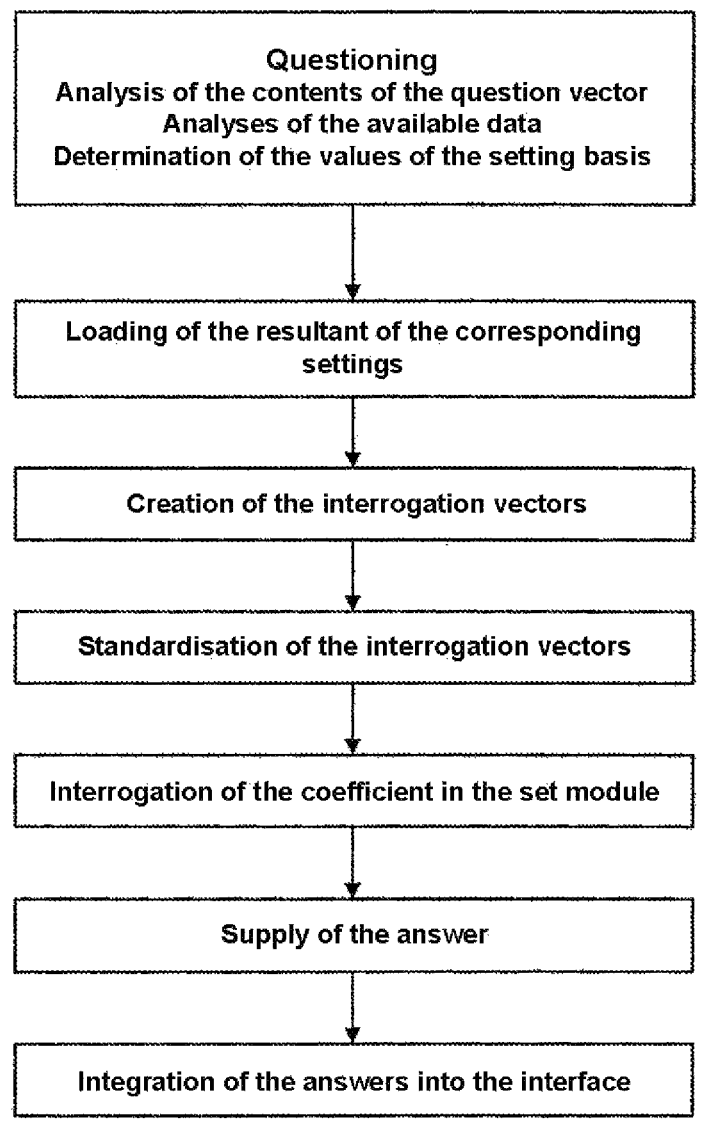
FIG. 6 is a block diagram indicating the steps of extraction of the indicators.
Figure 7:
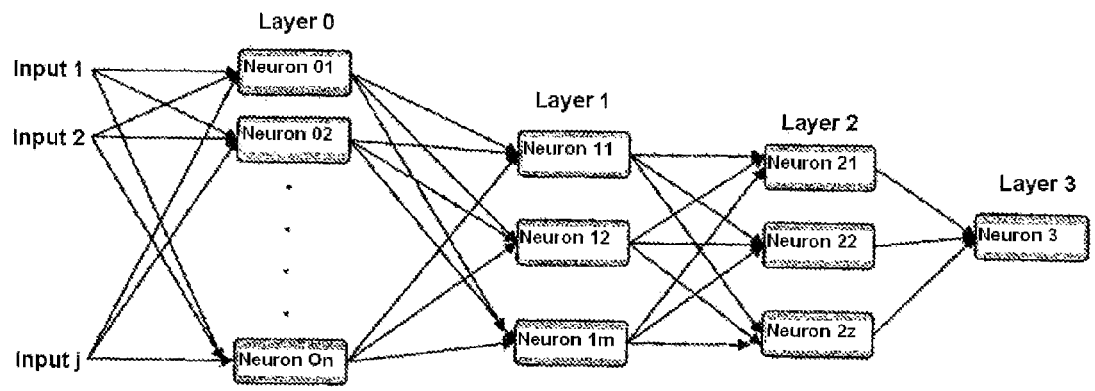
FIG. 7 is a diagram illustrating the structure of a standard configuration of a neural network.
Figure 8:
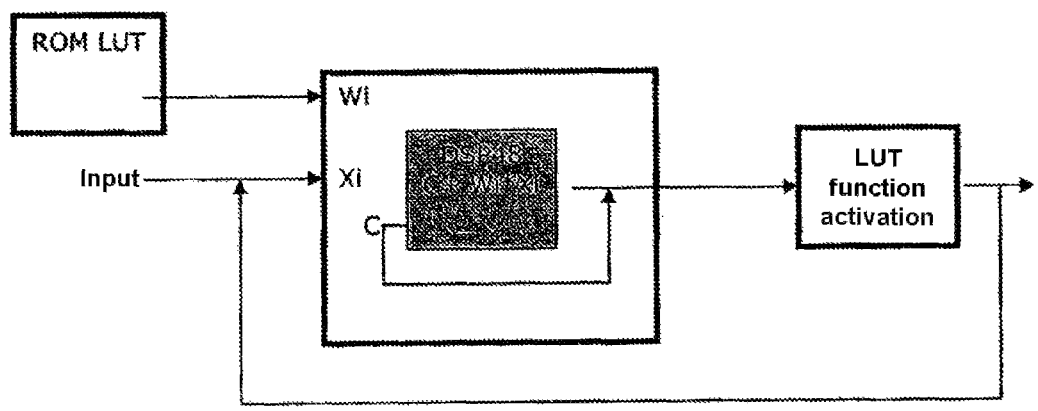
FIG. 8 is a block diagram showing the hardware implantation of a neuron in an FPGA, with the following abbreviations.

FIG. 5 is an illustration of this step wherein the setting is carried out between the vehicle, the road, the vehicle path on said road and the corresponding rolling limit values.

The method makes it possible, according to an accurate sequencing, to set (setting 3) the complex relations between the particular points and between all the variables characterizing the permissible dynamic paths. The database is a multivariable sequenced index.

A similar setting can be implemented for integrating elements characterizing the traffic and thus extending the determined limits to traffic limits.

The invention is also a device providing, in real-time, indicators as a function of the inputs available in the vehicle:
  The relative position on the path
  An additional positioning,
  Indications of relief and slope
  A differential GPS correction
  Danger entailed in the path The method is implemented in a vehicle using a vehicle-mounted device. Said device includes a memory in which are stored the setting algorithms, an extraction module and a strong parallel processor and a FPGA (which is an in situ programmable gates process), a characteristics parameterising module, an indicator output module, a module analyzing the behavior with respect to the indicators, and a module having for example the following 18 inlet-outlet interfaces:
  1. Gyroscope
  2. 2- or 3-axis accelerometer
  3. Variometer
  4. GPS—GALILEO
  5. Vehicle speed indicator
  6. Distance counter
  7. Roadworthiness test
  8. Wheel alignment checking
  9. Tire inflation measurement
  10. Navigation system
  11. Weather conditions data
  12. Vehicle 1 inner bus
  13. Vehicle 2 inner bus
  14. Additional memory containing the sequenced index database and the attributes.
  15. Local communication port 1
  16. Local communication port 2
  17. Local communication port 3
  18. External communication port 1
  19. External communication port 2
  20. External communication port 3

A mobile navigator of the PDA (Personal digital Assistant)/PND (Personal Navigation Device) type can be connected to the ports 4 and 10 through the ports 15, 16 and 17.

The device can be included in a PDA, a PND or a navigation system and can be integrated in a dedicated housing. It can be included in an existing vehicle-mounted FPGA.

The coupling to a navigation system makes it possible to implement simpler storage and memory accessing devices, since the device which is the subject of the invention can focus on the relevant memory area with respect to the geographic area in which the vehicle is travelling.

Contrary to all the other techniques or to the other navigation methods, the device is capable of interpreting relative data by comparing them, in a sub-metrical way, with the reality of the traffic lane and the possible variations in paths.

The device captures, in real time, all the data transmitted on the inlets thereof, the processor of the FPGA type activates the extraction and setting algorithms in order to compare the data from these inputs to the sequenced index. Then the device uses all the relevant data to characterize the path. The device gives a new position of the vehicle in a relative and continuous way with respect to the traffic lane and determines the relative path thereof.

Using an FPGA makes it possible, in less than one millisecond, to supply and process several cycles of information; gives accuracy to the information captured and the capacity of the device to locate, in real time, the data supplied by measuring elements and an accuracy to the information which is much greater than in all the existing commercially-available positioning and navigation systems.

One of the main advantages of the invention consists in that the path and the speed of the vehicle are the only two parameters required for guiding the driver in a dynamic way. One of the advantages lies in the fact that this invention can easily be used in any type of vehicle, not previously equipped.

The invention brings a major innovation with respect to the usually used systems by the original equipment manufacturers, the motor vehicle manufacturers and the navigation maps and systems suppliers.

The invention makes it possible, for any vehicle on any road, to know with a minimum of metrology aboard and as a function of the position of the vehicle only, the limits that the driver must not exceed where he or she is and for the road portions ahead.

The invention provides an improved positioning of the geographic location systems and the navigation system and relief and slopes references which will enable progress as regards the monitoring and the optimization of the fuel consumption and braking capacities.

One of the advantages of the method is that it is easily implemented through a vehicle-mounted system, and this is true even though such vehicles have no sensors such as those for the steering wheel angle, the measurement of adherence, or even though they are not provided with a driver assist system of the ESP or ABS type.

Each vehicle is not capable of supplying the aboard system with data of the same nature or same accuracy. Some vehicles have a PDA or PND or navigation systems, other vehicles are provided with equipment like the ESP which can provide certain variables which will make it possible to reinforce the accuracy of the path determination.

The method also makes it possible to set cause-effect relations between the characteristics of the car and the road+ information from equipped vehicles (speed of the center of gravity with respect to X and Y, rate of yaw, acceleration of the center of gravity with respect to X and Y, drift angle, wheel steering angle, wheel steering speed) and the rolling limits.

This aspect of the method makes it possible to obtain finer indicators than setting 1, and this technique is very innovative but requests measurement results which are not available in all the vehicles.

Each region or county does not necessarily provide real time information on the conditions of each road. The adherence data characterizing the roads are not always available.

The information required for characterizing the vehicle condition and the road conditions are mostly available.

The roadworthiness test can give information on the condition of shock absorbers, the brake dissymmetry, the steering system condition.

The checking of the wheel alignment can give the condition of the front and rear gears.

The measurement of pressure can be obtained by real time pressure sensors, the use of which will expand in the coming years.

The inner buses can supply the speed of the vehicle.

The local weather stations of the entities managing the roads give accurate information on microclimates reinforcing simple information delivered for example by the wipers and the instruments aboard for measuring the temperature outside. The driver can switch manually a rain condition indicator (light rainfall, heavy rainfall, storm)

Depending on the availability and the quality of the real time information in the vehicle, the system gives an indication on the reliability of the information and adapts the level of its own information to the driver.

The device aboard is parameterized by the user who inputs the brand and the type of the vehicle, the roadworthiness tests, the distance in kilometers and gives an estimation of the periodicity and the quality of the maintenance services. The roadworthiness tests center and the wheel alignment checking center can input their information. The device aboard can be connected to the inner bus of the vehicle or more simply to the contacts of the wiper and to the ISO speed cable. The device can display indicators for the information available. A more sophisticated version of the device makes it possible to compensate for the absence of information given by some drivers and to qualify the constant in the deviations of the path which can be attributed to the degradation of the vehicle.

The device aboard, makes the synthesis of the information available.

One of the functions of the methods consists in warning in real time the driver of the driving speed limits corresponding to his or her path at the place where he or she is and on the road portions ahead.

The rolling limit speeds are superimposed to the regulatory limit speeds and to the induced constraints of deceleration and acceleration limits and to the constraints inherent in the road attributes.

The driver's reaction can be analyzed as regards the information transmitted and as regards the characteristics of the road, of the vehicle and of the road conditions.

Another simultaneous function of the method consists in comparing the relative path of the vehicle with the security path and to extract the risks from this relative path. The system will warn the driver of the dangerousness of his or her path. When a certain level of danger in the path is exceeded, the method will no longer inform the driver of the regulatory limit speed but will focus the warning on the necessity to correct his/her path, the danger entailed in the path being mainly materialized by the risk of collision on the opposite lane and/or by the risk of ram off roadway accident.

Another function of the method consists in providing the driver with immediate risk and future risks indicators which display the variation in the level of risk correlatively with the driver's own actions. For example, inadequate over- or understeering will result in a change in the shape of the path and in a substantial reduction in the permissible rolling limits. If the driver drives far from the limit and his or her path is correct, the limit speed indicator will not warn him or her. If the driver drives close to the limit speed, this inadequate action will result in reducing the limit and thus in getting him or her closer to the real speed of the car and the indicator which will have already warned the driver of the danger and the limit area will reinforce its warning.

Another function of the method consists in giving reference information to the driver assist systems ESP and EBS such as the rolling limit speeds and the reference path with respect to the axis of the road.

Another function of the method consists in improving the accuracy of the position supplied by the existing (navigation and GPS) systems and more particularly to give a reference to Z.

Another function of the method consists in qualifying the adequacy of the prevention and protection means implemented by the road managers. Are the speed limits adapted to the dangerous and/or sensitive areas, for the families of vehicle and the various climatic conditions? Are the protection means adapted to ram off roadway accident-prone places, the guardrails, the margins etc. . . . .

Another function of the method makes it possible to draw accurate $1/1000^{th}$ scale maps on which the various path limits and the risks of ram off roadway accidents or driving on the opposite lane can be noted by vehicle family, as well as the dangers and protection and prevention means implemented by the institutions. These maps, which can be digital, can show the dangers and risks in a dynamic way as well as the modifications entailed by the changes in climatic conditions.

The method can be implemented with the existing data bases. As a matter of fact, the companies which collect the road data in order to draw the maps used in the navigation systems, the main ones being NAVTEQ and TELEATLAS (trademarks), know the reliability of their mapping data. The setting means (setting 1) distributed in a vehicle make it possible, by extraction, to supply the rolling limits, as a function of the mapping giving the reliability of the road which has been travelled on, from the start, and as a function of the vehicle characteristics. For example, if the reliability is particularly low, because the road geometry is known as being imprecise, the device will give information relating to a wide area in advance. If, on the contrary, the reliability is high, then the system will give more precise real time information as regards a particular bend.

Capturing the selection of the vehicle and its conditions can be carried out through the usual interfaces of the PDA, PND and navigation systems. The vehicles and their maintenance condition are classified in families, in which the device analyses the imprecise information input by the user and selects the limits of the most unfavorable cases.

Starting from the road database, the device extracts rolling limits which it qualifies in a simple way with respect to the type of the generic vehicle, in the form of indicators with a safety margin.

The driver selects his or her vehicle and the maintenance condition thereof and indicates the weather conditions; for each road section, the device calculates the future limit and compares it with the instantaneous speed or the deceleration and warns the driver if the values are dangerous for the next bend and for the following bend.

One of the techniques for making the extraction of paths and limits can be the interrogation of the database through neural networks.

One of the techniques for making the extractions in order to determine the reliability and for adjusting the answers within the flow of heterogeneous variables is the utilization of FPGAs.

Variables Defining the Path of the Vehicle

Position of the path sensor with respect to X

Position of the path sensor with respect to Y

Position of the path sensor with respect to Z
Limit Variables at Each Spot XYZ on the Path of the Vehicle
  Adhesion estimated maximum speed
  Rollover estimated maximum speed
  Corresponding accelerations derived from the speeds
  Road Attributes
  Number of lanes
  Width of lanes
  Direction of lanes
  Merging lanes
  Traffic circles
  Crossings
  Shoulders
  System of road signs and signs visibility
  Road visibility
  Right-of-ways
  Areas to be protected (schools, hospitals, crosswalks . . . )
  Dangers (ravines, reduced width and height . . . )
  Exposure (north slope, rain falls . . . )
  Speed from an indication sign
  Speed from a sign at the beginning or the end of an agglomeration
  Deceleration speed to comply with the indication
  Authorized acceleration speed from the end of the indication.

The invention claimed is:

1. A method for determining at least one rolling limit of a vehicle moving on a given traffic lane of a roadway, comprising:
   acquiring data characterising plural vehicles, where said data are organised by families each representative of vehicles sharing at least one vehicle characterising parameter, and where a given vehicle belongs to one of the families,
   acquiring geometric data defining a sample of plural traffic lanes representative of traffic lanes comprising the given traffic lane,
   acquiring data characterising the sample of plural traffic lanes,
   learning a neural network with the acquired data characterising plural vehicles, with the acquired geometric data and with the acquired data characterising the sample,
   obtaining geometric data defining the given traffic lane,
   obtaining data characterising the given traffic lane,
   obtaining data defining a vehicle path,
   obtaining data characterising the given vehicle,
   determining, in real time, a value for the rolling limits of the given vehicle, comprising:
   providing the obtained geometric data, the obtained data charactering the given traffic lane, the obtained data defining the vehicle path and the obtained data characterising the given vehicle in input of the neural network,
   calculating the rolling limit with the neural network based on the obtained geometric data, the obtained data charactering the given traffic lane, the obtained data defining the vehicle path and the obtained data characterising the given vehicle, and
   providing the calculated rolling limit in output of the neural network.

2. The method according to claim 1, wherein the rolling limits are selected among a rollover speed, a rollover acceleration, a slide-slip speed and a slide-slip acceleration.

3. The method according to claim 1, wherein the learning by the neural network includes:
   a step for setting between vehicles characterising data, geometric and characterising simplified data of the traffic lane and the rolling limits.

4. The method according to claim 1, wherein the learning by the neural network includes:
   a step of setting between the vehicle characterising data, permissible path data for the vehicle with respect to the traffic lane and the rolling limits.

5. The method according to claim 1, wherein the learning by the neural network includes:
   a step of setting between vehicle characterising, data characterising vehicles in motion, a speed of a centre of gravity with respect to X and Y, a rate of yaw, an acceleration of the centre of gravity with respect to X and Y, a drift angle, a steering of a wheel, a speed of the steering of the wheel and the rolling limits.

6. The method according to claim 1, wherein
   particular points are defined on the given traffic lane and a position thereof is defined,
   complex relations between the data characterising the given traffic lane, the geometric data defining the given traffic lane, a permissible dynamic path and the particular points are defined,
   the motion of the given vehicle is measured, an existence of particular points met during the motion is deduced and a relative path of said vehicle is determined,
   measured data of the motion are compared to the position of the particular points met upon a passage of the vehicle at said particular points so as to increase an accuracy of a vehicle location.

7. The method according to claim 6, wherein the particular points are defined by curvature or angle or altitude changes criteria which are remarkable.

8. The method according to claim 1, wherein the geometry data defining the traffic lane, the data characterising the traffic lane, the data defining the vehicle path, the data characterising the vehicle and variables of the rolling limits are obtained by:
   simulation,
   or real measures,
   or a vehicle manufacturer,
   or an independent organisation communicating qualification values,
   or through transmission of information delivered by map data suppliers,
   or by processing video images or real time or delayed time observation from satellites.

9. The method according to claim 1, wherein:
   the rolling limit values are compared with instantaneous values of the rolling of the vehicle;
   a warning is generated for a driver when an instantaneous value is greater than a matching limit value.

10. The method according to claim 1, wherein at least one indicator accessible by a vehicle driver is generated to inform him/her:
   of a danger in the paths,
   or an improved position,
   or of an existence of a relief or slope.

11. The method according to claim 1, wherein at least one indicator about an incidence on safety of an instantaneous speed of the vehicle at a given spot and downstream the traffic lane is generated in real time to a driver, relative to at least one of the following parameters: rolling limit, his or her path, a regulatory speed, the data characterising the traffic lane and weather conditions.

12. The method according to claim 1, wherein the data characterising the sample of plural traffic lanes include at least one of the following criteria:

an adherence parameter;
data indicating danger;
data indicating of an obligation of a low velocity passage.

13. The method according to claim 12, wherein the rolling limits include at least one of the following limits:
braking limit, acceleration limit, travelling limit;
instruction on the opposite lane, ram-off roadway accident, frontal collision with a vehicle, rear collision with a vehicle, collision with an engineering structure, a collision with an obstacle on the road, collision with pedestrians;
global adherence, rolling characteristic of the road relative to onboard equipment, road characteristics relative to a passengers' comfort, road characteristics relative to a driver's fatigue;
defects and failures: driving, driver, vehicle and vehicle equipment, selection of adjustment modes, variables to be corrected.

14. The method according to claim 2, wherein the rolling limits include traffic limits selected among:
a traffic slowdown, driving up a traffic line, a traffic flow.

15. The method according to claim 14, wherein the learning of the neural network includes:
a step of setting between geometric data, map data, crossing road, types of vehicles driving on the road, signalling, variable signs, alternate street lights, number of types of vehicles driving on these roads, the speed of the vehicle types driving on these roads, simultaneous weather conditions, simultaneous ephemerides, simultaneous events on and off the road, simultaneous accidentology, and the rolling limits.

16. The device for determining the rolling limits of a vehicle moving on the traffic lane of the roadway implementing the method according to claim 1.

17. The device according to claim 16 including a circuit of an in situ programmable gate network type for a strongly parallel processing of data.

18. The method according to claim 2, wherein the learning by the neural network includes:
a step for setting between vehicles characterising data, geometric and characterising simplified data of the traffic lane and the rolling limits.

19. The method according to claim 2, wherein the learning by the neural network includes:
a step of setting between the vehicle characterising data, permissible path data for the vehicle with respect to the traffic lane and the rolling limits.

20. The method of claim 1, wherein the at least one vehicle characterising parameter comprises at least one of a vehicle drive type and a weight/power output ratio.

21. The method of claim 1, wherein data characterising the given vehicle comprises at least one of a vehicle drive type, a weight/power output ratio, a dimension, a mass and a wheel base.

22. A method for determining at least one rolling limit of a given vehicle moving on a given traffic lane of a roadway, comprising:
acquiring data characterising plural vehicles, where said data are organised by families each representative of vehicles sharing at least one vehicle characterising parameter, and where the given vehicle belongs to one of the families,
acquiring geometric data defining a sample of plural traffic lanes representative of traffic lanes comprising the given traffic lane,
acquiring data characterising the sample of plural traffic lanes,
learning a neural network with the acquired data characterising plural vehicles, with the acquired geometric data and with the acquired data characterising the sample,
obtaining geometric data defining the given traffic lane,
obtaining data characterising the given traffic lane,
obtaining data defining a vehicle path,
obtaining data characterising the given vehicle,
determining, in real time, a value for the rolling limit of the given vehicle comprising:
providing the obtained geometric data, the obtained data charactering the given traffic lane, the obtained data defining the vehicle path and the obtained data characterising the given vehicle in input of the neural network,
calculating the rolling limit with the neural network based on the obtained geometric data, the obtained data charactering the given traffic lane, the obtained data defining the vehicle path and the obtained data characterising the given vehicle, and
providing the calculated rolling limit in output of the neural network, and
refining the data defining the vehicle path comprising:
i) defining particular points on the given traffic lane and defining a position thereof,
ii) defining relations between the data characterising the given traffic lane, the geometric data defining the given traffic lane, permissible dynamic paths and the particular points,
iii) measuring a motion of the given vehicle,
iv) deducing an existence of particular points met during the motion,
v) determining a relative path of said vehicle among the permissible dynamic paths based on the particular points met during the motion.

* * * * *

UNITED STATES PATENT AND TRADEMARK OFFICE
CERTIFICATE OF CORRECTION

PATENT NO. : 8,599,005 B2  Page 1 of 1
APPLICATION NO. : 12/306442
DATED : December 3, 2013
INVENTOR(S) : Fargas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 614 days.

Signed and Sealed this
Twenty-second Day of September, 2015

Michelle K. Lee
*Director of the United States Patent and Trademark Office*